United States Patent [19]

Mizerak

[11] Patent Number: 4,622,858
[45] Date of Patent: Nov. 18, 1986

[54] APPARATUS AND METHOD FOR CONTINUOUSLY MEASURING MASS FLOW

[75] Inventor: Dennis S. Mizerak, Brunswick, Ohio

[73] Assignee: The Babcock & Wilcox Company, New Orleans, La.

[21] Appl. No.: 715,692

[22] Filed: Mar. 25, 1985

[51] Int. Cl.⁴ .............................................. G01F 1/84
[52] U.S. Cl. .................................................. 73/861.38
[58] Field of Search .............. 73/861.37, 861.38, 32 A

[56] References Cited

U.S. PATENT DOCUMENTS

| | | | |
|---|---|---|---|
| 3,218,851 | 11/1965 | Sipin | 73/861.37 |
| 3,229,019 | 7/1967 | Sipin | 73/861.37 |
| 3,396,579 | 8/1968 | Souriau | 73/861.38 |
| 4,444,059 | 8/1984 | Smith | 73/861.37 |
| 4,491,025 | 1/1985 | Smith et al. | 73/861.38 |
| 4,559,833 | 12/1985 | Sipin | 73/861.38 |

Primary Examiner—Herbert Goldstein
Attorney, Agent, or Firm—Vytas R. Matas; Robert J. Edwards

[57] ABSTRACT

An apparatus and method for measuring mass flow rate utilizes a pair of parallel conduits having fixed ends. A driving mechanism is connected between the conduits near their mid-point for applying transverse oscillations to the conduits at a selected frequency. The fluid whose mass flow rate is to be measured is divided roughly equally and supplied through the parallel conduits. A motion sensor upstream of the driving mechanism and another one downstream of the driving mechanism produce signals which have the same frequency as the driving frequency but which lead or lag the driving frequency with regard to phase. This difference is phase is a measurement of mass flow rate.

10 Claims, 6 Drawing Figures

APPARATUS AND METHOD FOR CONTINUOUSLY MEASURING MASS FLOW

FIELD AND BACKGROUND OF THE INVENTION

The present invention relates in general to mass flow measuring techniques and, in particular to a new and useful apparatus and method of measuring mass flow rate of the fluid utilizing two spaced apart tubes each meant for carrying about one half of the flow, which tubes are forced to oscillate between fixed points in order to impart a reciprocating angular rotation to the tubes.

Devices are known which utilize the effect of angular motion on a moving fluid to directly measure mass flow. See for example, U.S. Pat. No. 2,865,201 issued Dec. 23, 1958 to Roth and U.S. Pat. No. 3,355,944 issued Dec. 5, 1967 and U.S. Pat. No. 3,485,098 issued Dec. 23, 1969 to Sipin.

U.S. Pat. No. 4,109,524 issued Aug. 29, 1978 to Smith, discloses an apparatus and method for measuring mass flow rate through a conduit by reciprocating a section of the conduit to produce longitudinal angular rotation of that section. Linkages are connected to the section both for reciprocating it and for measuring a force exerted on the section which force is due to an apparent force produced by mass flow through the conduit section. A direct measurement can thus be taken of the mass flow rate in this manner.

To understand how mass flow rate can be measured using the effects of this force, reference is now made to FIG. 1 which shows an arrangement of vectors on an X, Y, Z coordinate system.

When a moving mass m with a velocity vector $\bar{v}$ is acted upon by a force that causes angular velocity $\bar{w}$ about some axis, a force $\bar{F}_c$ is observed such that:
$\bar{F}_c = 2m\bar{w} \times \bar{v}$ If a tube for carrying a fluid, shown at 10 in FIG. 1, is rotated in the $\bar{F}_c - \bar{v}$ plane, in the clockwise direction shown by arrow 12, this causes an angular velocity $\bar{w}$ as shown in FIG. 1. If however, rather than rotating conduit 10 in one direction shown by arrow 12, the conduit is caused to oscillate back and forth about its pivot which is shown at 16, the magnitude and polarity of the angular velocity $\bar{w}$ will also oscillate and, therefore, the magnitude and polarity of the force $\bar{F}_c$ will oscillate proportionately.

For any point along the tube, for example the point 14, a displacement vector can be represented for small amplitudes as lying along the $\bar{Y}$-axis only. As the flow tube 10 is forced to oscillate by a sinusoidal driver about its pivot point 16 with very small amplitude, and with the point 14 far from the pivot point 16, then the magnitude of its displacement, velocity and acceleration vectors can be represented by a graph which is shown at FIG. 2. The displacement of point 14 along the $\bar{Y}$-axis is shown by the solid line 20. The velocity v of the point 14 is shown by the dash double dot line 22. This is in the units of inches/second and represents dy/dt.

Acceleration A is shown by the solid line 26 and represents the second derivative of displacement with respect to time, in the units inches/second$_2$ and represents $d^2y/dt^2$.

If there is a fluid flowing in the tube, a force $\bar{F}_c = 2m\bar{w} \times \bar{v}$, acting on the flowing mass, will also be developed. By Newton's third law it will develop an equal and opposite force $-\bar{F}_c$ acting on the tubing itself and be acceleration $\bar{A}'$, with $-\bar{F}_c$ and $\bar{A}'$ along the $\bar{Y}$-axis. The magnitude of $\bar{A}'$ is shown by the dotted line 28. From the definition for the force $-\bar{F}_c$ set forth above, it can be seen that this force is proportional to the velocity of the point 14, which is 90° out of phase with the acceleration due to the driving force applied to the conduit. The resultant force acting at the point 14 will be the sum of the driving and the force $-\bar{F}_c$, with these two forces 90° our of phase. The dot-dash curve 24 represents the sum associated with the accelerations $\bar{A}$ plus $\bar{A}'$ which is proportional to the sum of the driving force and the force $-\bar{F}_c$. A phase difference of $\phi$ between the original driving acceleration and the resultant summed acceleration will, therefore, be a direct measurement of the force $-\bar{F}_c$ which is directly proportional to the mass flow rate.

If the driving force is sinusoidal, then its displacement, velocity and acceleration will likewise be sinusoidal and vary by 90° and 180° respectively. This allows the phase difference $\phi$ to be equal regardless of whether it is measured relative to the displacement, velocity or acceleration functions of the drive force versus resultant drive force plus the force $-\bar{F}_c$.

SUMMARY OF THE INVENTION

The present invention is drawn to a method and apparatus for measuring mass flow rate.

According to the invention, a pair of parallel conduits are mounted in side by side relationship with their ends being fixedly supported. Driving means are provided in the middle of the conduits and between them for applying lateral oscillations to the conduits which displace them repeatedly away and toward each other. This oscillation is permitted due to the flexibility of the conduits and since their ends are held at fixed locations.

Sensors are provided on either side of the driving means and roughly halfway between the driving means and each respective support. These sensors produce signals which correspond to the velocity of the tubes at the locations of the sensors.

Connectors and passages are provided to the supports for supplying a mass flow which is divided approximately evenly between the two conduits through one of the supports and then recombined and discharged from the other support.

With no fluid passing through the conduits, the frequency of oscillation for the drive means will exactly match and be in phase with the frequency of oscillations sensed by the two sensors. If a mass flow beings to pass through the conduits, however, all the sensors will continue to sense the same frequency as the driving frequency, the leading sensor in the direction of mass flow will lag the driving frequency with regard to its phase and the downstream sensor will lead the driving frequency, again with regard to phase. This phase lead and lag is directly usable as a measurement of mass flow rate through the conduits.

Accordingly, an object of the present invention is to provide an apparatus for measuring mass flow rate of a fluid which comprises a pair of parallel conduits which have opposite ends, an axis and a mid-point, support means for supporting the opposite ends at substantially fixed locations and drive means for oscillating the conduits between their opposite ends and in a direction transverse to their axes. Connector means are provided on the support means for supplying fluid to the conduit and for dividing the flow of fluid substantially equally between the conduits. At least one sensor is provided at a location spaced from the mid-point and spaced from both opposite ends, the sensor sensing movement. The movement sensor may either sense displacement, velocity or acceleration. A phase difference between the sensed motion and the driving motion is a measurement of mass flow rate for the fluid through the conduits.

Another object of the invention is to provide such an apparatus wherein the drive means is provided at the mid-point of the conduits and a pair of sensors are provided on opposite ends of the mid-point. The upstream sensor lags the driving force with regard to phase and the downstream sensor leads the driving force. A measurement of phase lead and phase lag yields a measurement of mass flow rate.

A still further object of the invention is to provide an apparatus for measuring mass flow rate which is simple in design, rugged in construction and economical to manufacture.

A still further object of the invention is to provide a method of measuring mass flow rate which utilizes the difference in phase between sensed movements of oscillating parallel conduits, and an oscillating force supplied near the mid-point of the conduits.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 6 is graph of two equal frequencies but out of phase sinusoidal curves showing a $t_1$ time difference between them.

DESCRIPTION OF THE PREFERRED EMBODIMENT

Figure 1:
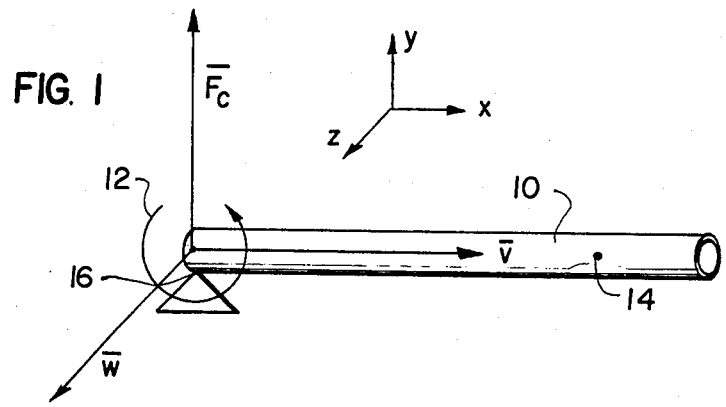
FIG. 1 is a diagram showing a coordinate system in which a conduit for carrying a mass flow can be rotated to illustrate the occurrence of a force $\overline{F}_c$.
Figure 2:
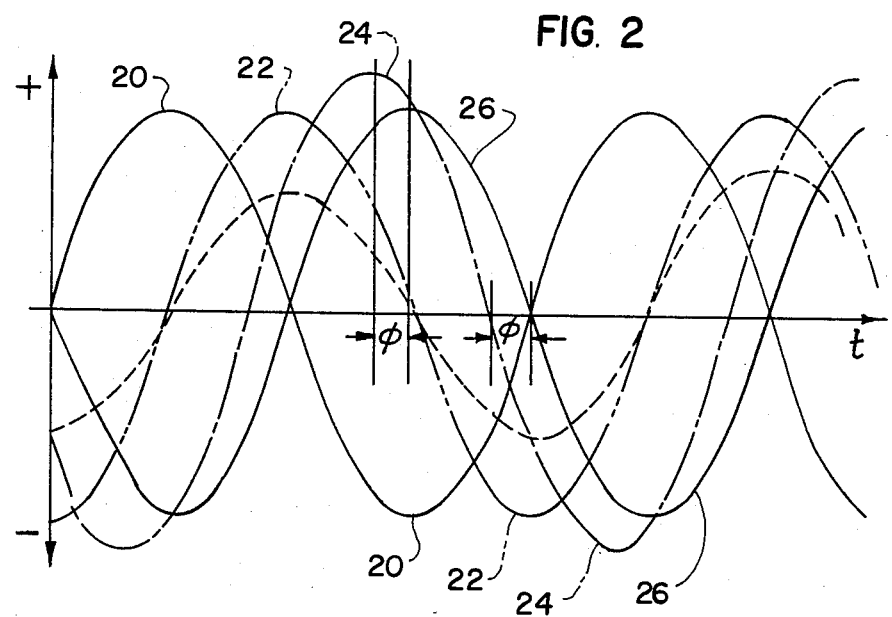
FIG. 2 is a graph showing various characteristics of motion and forces experienced at a certain point on the conduit in FIG. 1.
Figure 3:
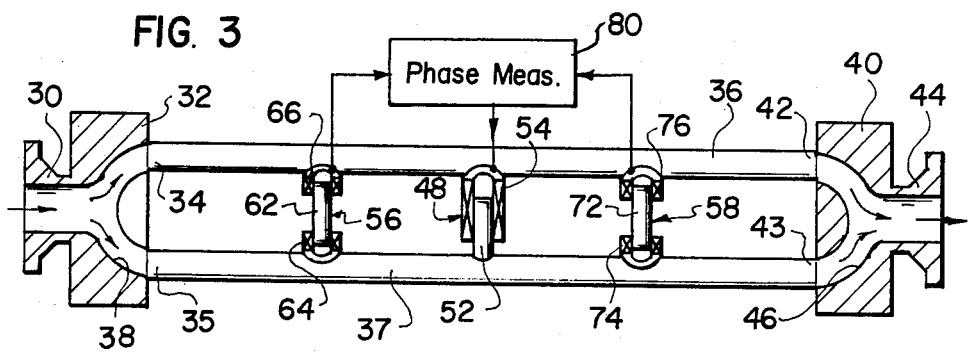
FIG. 3 is a side elevational view of an embodiment of the invention.

Referring to FIG. 3, the invention embodied therein comprises a device for measuring mass flow rate supplied to an inlet connection 30. Inlet connection 30 is connected to a first support 32 which fixes ends 34 and 35 of a pair of parallel conduits 36 and 37. A Y-shaped passage 38 is defined in support 32 for approximately dividing the mass flow into connection 30 into two equal parts. Half the mass flow is supplied to conduit 36 and the other half to conduit 37.

Conduits 36 and 37 have opposite ends 42 and 43 respectively which are connected to a second support 40 which carries an outlet connection 44. Another Y-shaped passage 46 is defined in support 40 for combining the flows of conduits 36 and 37 back together and into discharge connection 44.

Figure 4:
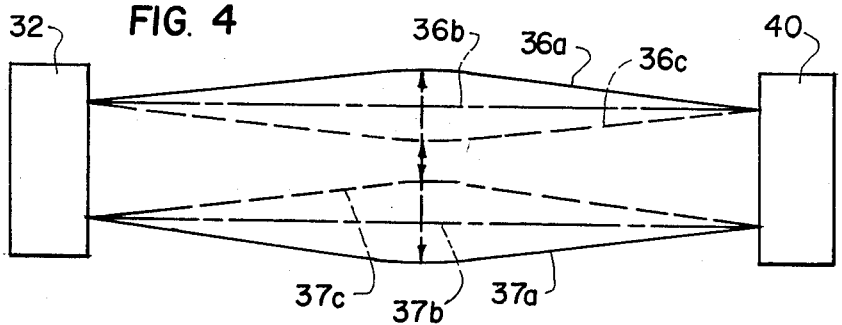
FIG. 4 is a schematic representation of the movement experienced by conduits used in the invention.

A driving mechanism 48 is provided near the middle and between conduits 36 and 37. Driving mechanism 48 includes a solenoid coil 54 which is fixed for example, to conduit 36, and a permanent magnet 52 which rides in coil 54 and is fixed to conduit 37. By applying electricity to coil 54 at a selected frequency, conduits 36 and 37 can be made to oscillate toward and away from each other, in an up and down direction. FIG. 4 which is a schematic representation of the device in FIG. 3, shows tubes 36 and 37 as lines. The maximum amplitude that the tubes achieve away from each other are shown by the solid lines 36a and 37a. The maximum approach is shown by the dotted lines 36c and 37c and the rest position is shown by the dot-dash lines 36b and 37b.

Turning back to FIG. 3, tubes 36 and 37 are provided with a pair of sensors 56 and 58 which are spaced apart from each other and positioned on opposite sides of the driving mechanism 48. Sensor 56 comprises a permanent magnet 62 which is magnetically coupled to coil 66 which are connected to tubes 37 and 36 respectively. In similar fashion, sensor 58 includes a permanent magnet 72 which rides in coil 76 connected to conduits 37 and 36 respectively.

By oscillating conduits 36 and 37 in the manner shown in FIG. 4, sinusoidal currents are induced in coils 66 and 76. These signals are proportional to velocities of the tubes toward and away from each other at the respective sensor locations.

When no fluid is passing through conduits 36 and 37, the oscillation applied by driving mechanism 48 to the mid-point of tubes 36 and 37 will generate signals in sensors 56 and 58 which are in phase with each other and in phase with the velocity of the driving mechanism 48.

When fluid passes through conduits 36 and 37 however, a phase difference appears between the signals of sensors 56 and 58.

Sensor 56 generates a velocity signal which lags behind the velocity of the driving mechanism 48 and sensor 58 generates a signal which leads the velocity of the driving mechanism 48.

A device shown schematically at 80 in FIG. 3 is connected to sensors 56 and 58 as well as to the driving mechanism 48 or at least its power supply for measuring the phase lead and phase lag of the respective velocity signals. The phase lead and phase lag, relative to the velocity of the driving mechanism is related directly to the mass flow rate through the conduits 36, 37.

Figure 5:
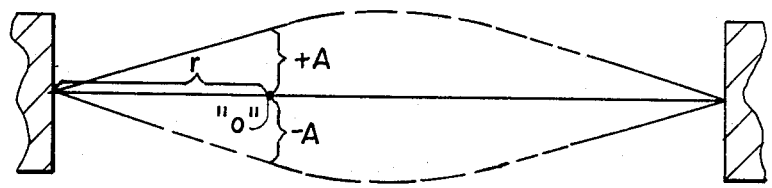
FIG. 5 is a diagram showing the maximum amplitude of an oscillating conduit.

FIG. 5 is a schematic illustration of one of the conduits. The position for one of the sensors is shown at "o". This is at a point a distance r from the closest support for the conduit. At this point "o" the conduit executes an upward swing having a maximum amplitude plus A and a downward swing having a maximum amplitude minus A.

In the following analysis the displacement from point "o" is designated by the letter y.

For any point on the flow tube, the displacement from its rest position, y, while being forced to oscillate at resonance with maximum amplitude A in simple harmonic motion is given as:

$$y = A \sin wt \tag{1}$$

where
y = displacement from rest position
A = maximum amplitude
w = $2\pi f$ f = resonant frequency
t = time, t = $\theta$ is when the oscillating begins.

Since the tube is fixed at both ends and can only move transversely to its own rest axis, the displacement y is up and down. The velocity of point "o" up and down is then:

$$v = \frac{dy}{dt} = wA \cos wt \qquad (2)$$

and its acceleration is then:

$$a = \frac{dv}{dt} = \frac{d^2y}{dt^2} = -w^2 A \sin wt \qquad (3)$$

The force $-F_c$ (a vector) acting on point "o" will be up and down as well as the induced oscillations and follow the equation:

$$-\bar{F}_c = -2m\bar{W}_c \times \bar{v}_c \qquad (4)$$

where
$-\bar{F}_c$ = the apparent force resulting from the effect of the angular velocity on the moving fluid.
m = mass of fluid flowing past point "o"
$\bar{W}_c$ = angular velocity of point "o" = $|\bar{V}/r|$ and $(\bar{V} = \bar{w} \times \bar{r})$
$\bar{V}_c$ = velocity of the fluid flowing past point "o".

If k = spring constant of the tube at point "o", then the induced oscillating force amplitude is:

$$|F| = -ky = -kA \sin wt \qquad (5)$$

since the two forces act in the same directions, their magnitudes can be summed directly:

$$F - F_c = |\bar{F}| + |-\bar{F}_c| = (-2m_c V_c V/r) + (-kA \sin wt) \qquad (6)$$

Substituting V = wA cos wt:

$$F - F_c = \left(\frac{-2m_c V_c}{r}\right) wA \cos wt - kA \sin wt \qquad (7)$$

Since $m_c$, r, $V_c$, w, $w^2$ and A are all constants for constant mass flowrate, then this reduces to:

$$F - F_c = B_1 \cos wt + B_2 \sin wt \qquad (8)$$

with $$B_1 = \frac{-2 wA m_c V_c}{r}$$

and $B_2 = -kA$.

The sum of $B_1 \cos wt + B_2 \sin wt$ as shown in Equation (8) may be expressed as:

$$B_1 \cos wt + B_2 \sin wt = \gamma \sin (wt + \beta) \qquad (9)$$

with
$\gamma = (B_1^2 + B_2^2)^{\frac{1}{2}}$ and
$\beta = \arctan (B_1/B_2)$

Equation (9) mathematically shows that the resultant force on point "o" is at the same frequency as both driving resonant oscillations, $B_1 \cos wt$ and $B_2 \sin wt$; but out of phase by $\beta$, where:

$$\beta = \arctan\left(\frac{B_1}{B_2}\right) = \arctan\left(\frac{-2wAm_c V_c}{-kAr}\right) \qquad (10)$$

or:

$$\beta = \arctan\left(\frac{2wm_c V_c}{kr}\right) \qquad (11)$$

since $w = 2\pi f$, where f = frequency of oscillations, which is held constant at the natural resonant frequency of the tube and r is a fixed distance and k is a constant then $$\beta = \arctan\left(\frac{m_c V_c}{\alpha}\right) \qquad (12)$$

with $\alpha = \left(\frac{kr}{4\pi f}\right)$

Therefore:

$$m_c V_c = \alpha \tan (\beta) \qquad (13)$$

with $m_c V_c$ = mass flow rate.

Thus, the force acting on point "o" is sinusoidal as is the driving force and at the same frequency and only differs by a phase change $\beta$. The displacement, velocity or acceleration functions (as well as any higher derivates of these) also differ in phase to the corresponding drive force by the same amount:

$$\beta \pm n\pi/2 \qquad (14)$$

where n is an integer. For very small phase shifts, equation (12) becomes $$\beta = \arctan (m_c V_c/\alpha) \approx m_c V_c/\alpha = m_c V_c(4\pi f/kr) \qquad (15)$$

In order to eliminate the frequency dependent term f, we must examine the two signals, which differ only in phase $\phi$ as they are represented in the amplitude as a function of time graph in FIG. 6.

Their frequencies are equal and their periods will be:

$$T = 1/f \qquad (16)$$

with $$T = \text{period} = 2 (t_1 + t_2) \qquad (17)$$

Their relative phase angle $\beta$ is then defined as:

$$\beta = \pi t_1/(t_1 + t_2) = 2\pi t_1 f \qquad (18)$$

Substituting equation (18) into (15) yields:

$$\beta = m_c V_c(4\pi f/kr) = 2\pi t_1 f \qquad (19)$$

and therefore:

$$m_c V_c = \text{mass flowrate} = (kr/2)t_1 \qquad (20)$$

which eliminates the frequency dependency and requires only that the spring constant k, length r and time interval $t_1$ be known. The time interval $t_1$ can be measured using an oscilloscope and standard laboratory techniques.

For any set of conditions, k and r will be constants, and therefore, a measure of $t_1$ will be directly proportional to mass flowrate. It is obvious that $t_1$ can be measured along any line through the signals as shown in FIG. 6 and is not restricted to the "zero crossing" base line. The time difference $t_1$ can be measured between any two points with equal first and second derivatives during any one cycle on the two signals regardless of gain or DC offset factors.

In the present design, the point "a" on the split parallel tubes of FIG. 3 will follow the above progression. The mass flowrate can be directly measured by measuring the time difference $t_1$ between the induced signal at point "u" and the mass flowrate effected signal at point "a". With flow as shown in FIG. 3, point "a" will lag point "u". Likewise point "b" will lag point "v", point "c" will lead point "u" and point "d" will lead point "v". (The phase angle amplitude will be equal between all these respective points with leading points positive and lagging points negative.) Therefore, the total phase difference $\phi$ between the lag at points "a" and "b" and the lead at points "c" and "d" will provide a signal sampling the total direct mass flowrate through both tubes twice as a weighted average. The sum of the lead and lag phase angles will, therefore, cancel and provide the resonant frequency data necessary to maintain the tubes at their natural resonant frequency regardless of pressure, density or temperature variations.

The split parallel tubing arrangement of FIG. 3 also allows both halves of the drive coil 48 and both of the sensor coils 66, 76 to be mounted to the flow tubes 36, 37 directly and help reduce common mode vibration noise and improve performance (provided that the sprung masses at points "a", "b", "c" and "d" are all equal, and at points "u" and "v" are equal.)

Thus, the advantages of the split parallel tubes approach of FIG. 3 are as follows. Direct mass flowrate measurement proportional to the time measurement between points with equal first and second derivatives during any one cycle of two equal frequency signals; simple, rugged mechanical design; ease of assembly; small overall size; ease of installation; process fluid density insensitive; only slight temperature dependency ease of scaling up and down in size; process fluid viscosity insensitive and applicable to liquids, gases and slurries.

In the alternative, phase measuring devices, such as that shown in FIG. 3 at 80, are known. An example is Hewlett Packard Model 3575A. The phase difference from the driving point to the sensing point near the center of the tubes, and the sensing point, spaced away from the center, can thus be utilized as a measurement of mass flowrate. Sensors, as provided, on both sides of the driving mechanism increase accuracy.

While a specific embodiment of the invention has been shown and described in detail to illustrate the application of the principles of the invention, it will be understood that the invention may be embodied otherwise without departing from such principles.

What is claimed is:

1. An apparatus for measuring mass flow of a fluid flow, comprising:
   a pair of straight parallel conduits each having opposite ends, as well as an axis and a mid-point between said opposite ends;
   support means connected to said conduits for holding said opposite ends at substantially fixed positions;
   connector means connected to said support means for supplying a fluid flow whose mass flow rate is to be measured to said pair of parallel conduits, each conduit receiving about one half of the fluid flow at one end of said support means and recombining said fluid flow at the other end of said support means;
   drive means associated with said conduits for oscillating said conduits towards and away from each other at a selected frequency in a direction transverse to their respective axis and substantially at their respective mid-point; and
   at least one sensor for sensing motion of said conduits at a sensing point spaced from each mid-point and from said opposite ends for sensing any phase difference of the selected frequency between said parallel conduits.

2. An apparatus according to claim 1, including a second sensor for sensing motion of said conduits at a second sensing point spaced from each mid-point and on a side of each mid-point opposite from said first mentioned sensing point, said first mentioned sensing point being upstream of each mid-point with respect to a direction of fluid flow and said second sensing point being downstream of each mid-point with respect to said direction, motion at said first mentioned sensing point lagging said selected frequency with respect to phase and motion at said second sensing point leading said selected frequency with respect to phase, said lead and lag of phase corresponding to mass flow rate of the fluid flow.

3. An apparatus according to claim 1, including detector means for measuring a phase difference between motion sensed at said sensing point and said selected frequency for oscillating said conduits substantially at their respective mid-point, said phase difference corresponding to a measurement of mass flow rate for the fluid flow.

4. A method for measuring mass flow rate of a fluid flow, comprising:
   oscillating mid-points of a pair of straight parallel conduits towards and away from each other at a selected frequency while holding opposite ends of the conduits substantially fixed;
   passing about one half of a fluid flow whose mass flow rate is to be measured through each of the conduits;
   sensing motion of each conduit at a first sensing location spaced from the mid-points of the conduits and from the opposite ends of the conduits; and
   measuring a phase difference between the selected frequency of oscillation at said mid-points and the measured motion at said first sensing location induced in said pair of parallel conduits, which measurement corressponds to the mass flow rate of the fluid flow.

5. A method according to claim 4 including sensing motion of the conduits at a second sensing location spaced from the mid-point and on an opposite side of the mid-points from said first sensing location, said second sensing location also being spaced from the conduit ends, and measuring a phase difference between motion at said second sensing location and said selected frequency of oscillation at said mid-points, which phase difference also corresponds to the mass flow rate of the fluid flow.

6. An apparatus for measuring mass flow of a fluid flow, comprising:
a pair of straight parallel conduits each having opposite ends, as well as an axis and a mid-point between said opposite ends;
support means connected to said conduits for holding said opposite ends at substantially fixed positions;
connector means connected to said support means for supplying a fluid flow whose mass flow rate is to be measured to said pair of parallel conduits, each conduit receiving about one half of the fluid flow;
drive means associated with said conduits for oscillating said conduits at a selected frequency in a direction transverse to their respective axis and substantially at their respective mid-points including a solenoid coil connected to one of said pair of conduits at its mid-point and a permanent magnet connected to the other of said pair of conduits at its mid-point and movable in said coil, as well as current means connected to said solenoid coil for applying current to said solenoid coil at said selected frequency for oscillating said conduits;
at least one sensor for sensing motion of said conduits at a sensing point spaced from each mid-point and from said opposite ends; and
a second sensor for sensing motion of said conduits at a second sensing point spaced from each mid-point and on a side of each mid-point opposite from said first mentioned sensing point, said first mentioned sensing point being upstream of each mid-point with respect to a direction of fluid flow and said second sensing point being downstream of each mid-point with respect to said direction, motion at said first mentioned sensing point lagging said selected frequency with respect to phase and motion at said second sensing point leading said selected frequency with respect to phase, said lead and lag of phase corresponding to mass flow rate of the fluid flow.

7. An apparatus according to claim 6, wherein said first mentioned sensor comprises a first sensing coil connected to one of said pair of conduits at said first mentioned sensing point and a first sensor permanent magnet connected to the other of said pair of parallel conduits, said second sensor comprising a second sensor coil connected to one of said pair of conduits at said second sensing point and a second sensor permanent magnet connected to the other of said pair of parallel conduits.

8. An apparatus according to claim 7 including phase measuring means connected to said first and second sensor coils of each conduit and to said solenoid coil for measuring phase lead and phase lag for motions at said first mentioned and second sensing points with respect to said selected frequency.

9. An apparatus according to claim 8, wherein said support means comprises a first support having an input connector for receiving fluid flow, a Y-shaped passage in said first support connected between said input connector and first ends of each conduit for dividing flow between said conduits.

10. An apparatus according to claim 9, wherein said support means further comprises a second support having an output connection for receiving fluid flow from said conduits and a further Y-shaped passage defined in said second support connected between second ends of said conduits and said output connector.

* * * * *